June 1, 1965 C. DE VRIES 3,187,271

RELAXATION OSCILLATOR WITH TIMING CAPACITOR CHARGE PATH
ISOLATED FROM TRANSISTOR LEAKAGE CURRENT

Filed May 3, 1961

INVENTOR
COOS DE VRIES
BY Frank R. Jifani
AGENT

United States Patent Office 3,187,271

Patented June 1, 1965

3,187,271
RELAXATION OSCILLATOR WITH TIMING CAPACITOR CHARGE PATH ISOLATED FROM TRANSISTOR LEAKAGE CURRENT

Coos de Vries, Hilversum, Netherlands, assignor to North American Philips Company, Inc., New York, N.Y., a corporation of Delaware Filed May 3, 1961, Ser. No. 107,484
Claims priority, application Netherlands, June 3, 1960, 252,324
4 Claims. (Cl. 331—109)

This invention relates to devices comprising a transistor connected as a relaxation generator, the output electrode circuit of the transistor being coupled to the control electrode circuit through a positive feedback circuit and the control electrode circuit including a relaxation capacitor which is charged via a relaxation resistor and discharged via the transistor.

For several uses in practice, such devices involve the difficulty that their operation is highly dependent upon the properties of the transistor, for example upon the current gain, the leak current of the transistor, etc. More particularly when such a device is used for supervision purposes in transmission equipment, it is difficult to fulfil the requirements to be imposed upon supervision because of the high dependency upon the properties of the transistor. For example, the response level greatly depends upon these properties and, in addition, the proportioning of the relaxation generator is materially restricted.

An object of the invention is considerably to reduce the dependency upon the transistor properties and hence to widen the possibilities of application of a device of the type mentioned in the preamble.

A device according to the invention is characterized in that the control electrode of the transistor is connected to a constant bias source which makes the transistor conducting, whilst the control electrode circuit includes, between the control electrode and the relaxation capacitor, a rectifier which is cut off by the bias potential applied to the control electrode.

In order that the invention may be readily carried into effect, it will now be described in detail, by way of example, with reference to the accompanying diagrammatic drawing, in which.

Figure 1:
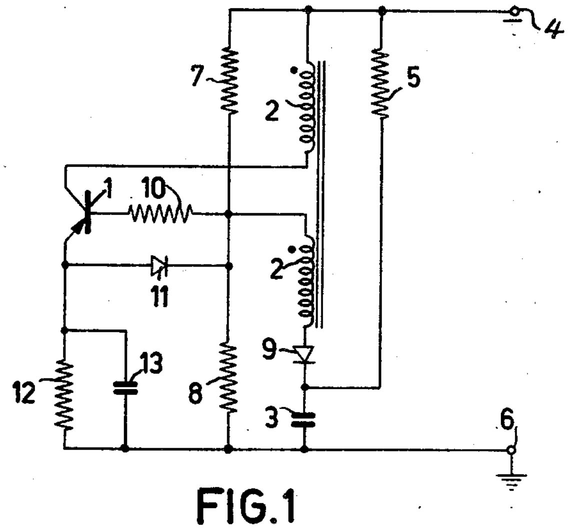
FIGURE 1 shows a device according to the invention.

The device according to the invention shown in FIGURE 1 comprises a transistor 1 which is connected as a relaxation generator, the output circuit formed by the collector circuit being positively backcoupled to the control electrode circuit formed by the base circuit of transistor 1.

In the relaxation generator shown, the collector circuit is positively backcoupled to the base circuit by means of a feed back transformer 2, the base circuit including a relaxation capacitor 3 which is charged through a relaxation resistor connected to the negative terminal 4 of a supply voltage source and which is discharged through transistor 1. As is known per se, the device shown has two unstable conditions, the relaxation generator 1 flip-flopping from one condition to the other.

In the first condition, the transistor 1 is cut off by a positive voltage across the relaxation capacitor 3, which is gradually charged in the negative sense via the relaxation resistor 5, thus causing the transistor 1 to be gradually released. The amplification of the transistor 1 thus gradually increases and hence also the all-round amplification of the relaxation generator determined by the amplification of the transistor 1 and the feedback factor, until upon reaching a sufficiently high all-round amplification the transistor 1 suddenly passes via the feedback transformer 2 to the second unstable condition because of the regenerative action, whereby the transistor 1 is released. The collector current of the transistor 1 thus rapidly increases, whereby at the same time the relaxation capacitor 3 is discharged and the voltage of the relaxation capacitor 3 increases in the positive sense, until upon reaching the maximum value of the collector current the transistor 1 is suddenly flopped back to the cut off condition via the feedback transformer 2. The relaxation generator 1 thus has returned to its initial condition, whereafter the described cycle is repeated.

In the device shown, the operation of the relaxation generator 1 greatly depends upon the properties of the transistor. In the first place, for changing over the transistor 1 from the blocked condition to the released condition, it is necessary for the voltage across the relaxation capacitor 3 to have increased so that the voltage across the transistor 1 has a value high enough to set in the relaxation process, whilst another drawback resides in the leakage currents which still occur in the blocked condition of the transistor 1 and which cause the relaxation capacitor 3 to be charged via the base, thus limiting the proportioning of the time constant of the relaxation circuit 3, 5. Such a transistor leakage current is very interfering especially for a sufficiently high time-constant of the relaxation circuit 3, 5, for which the relaxation resistor 5 has a high value, since in this very case the transistor leakage current is equal to the current for charging the capacitor which flows through the relaxation resistor 5.

In a device according to the invention, in order to overcome the said limitation, a constant bias potential, which releases the transistor 1, is applied to its base by means of a voltage divider 7, 8 which is connected between the terminals 4, 6 of the supply voltage source, whilst the base circuit includes, between the base and the relaxation capacitor 3, a rectifier 9 which is cut off by the bias potential of the base. More particularly by suitable proportioning of the voltage divider 7, 8, the transistor 1 may be adjusted to a suitable work-point, whilst the blocked rectifier 9 ensures that the relaxation circuit 3, 5 of the transistor circuit is decoupled. The relaxation circuit 3, 5 may thus by proportioned to have a large time-constant that is not adversely affected by transistor leakage currents. In the embodiment shown, for example, the time constant of the relaxation circuit is 57 seconds.

Whenever in this device the voltage of the relaxation capacitor 3 exceeds the bias of the base due to charging of the relaxation capacitor 3 via the relaxation resistor 5, the variation in voltage set up at the base of the transistor, which is adjusted to a suitable work-point of the bias of the base, is amplified with a maximum value, resulting in the transistor 1 immediately passing to the condition with maximum collector current, that is to say, the response level in the relaxation generator 1 is exactly equal to the base-bias of the transistor and hence independent of the properties of the transistor. The rectifier 9 is thus released by the feedback voltage originating from the feedback transformer 2 and the relaxation capacitor 3 can discharge through the transistor 1.

In order to protect the transistor 1 against the comparatively great current discharging the capacitor, a series-resistor 10 is included between the base and the common point of the voltage divider 7, 8 and the base circuit, whilst the emitter is connected via a rectifier 11 to the common point of the series-resistor 10 and the voltage divider 7, 8. The series-resistor 10 and the rectifier 11 fulfil the function of a current limiter, since the rectifier 11 is released by the voltage across the series-resistor 10 upon a given flow of current through it so that when the current discharging the capacitor increases further, this current can pass via the rectifier 11 directly to the emitter circuit independently of the transistor 1.

If in this device, due to the discharge of the relaxation capacitor 3, the voltage of the relaxation capacitor 3 has exceeded the sum of the base-bias and the feedback voltage in the base circuit, the rectifier 9 is blocked and the feedback circuit 2 of the transistor 1 is made inoperative, so that the transistor 1 is again adjusted to its normal work-point determined by the base-bias. The capacitor 3 is then recharged via the relaxation resistor 5, until the voltage of the capacitor exceeds the base-bias of the transistor 1, whereafter the described cycle is repeated.

The fact that the transistor 1, whch is circuited as a relaxation generator, is continuously conducting, makes it possible for the residual dependency upon the properties of the transistor to be substantially reduced by means of a negative feedback. For this purpose, the emitter circuit of the transistor 1 includes an impedance, active as a negative feedback for direct currents, which is formed by the parallel combination of a resistor 12 and a capacitor 13. By suitable choice of the time constant of the parallel combination of capacitor 13 and resistor 12 included in the emitter circuit, it may at the same time be ensured that the discharge voltage of the relaxation capacitor 3, after the discharge via the transistor 1, has a suitable value.

The aforementioned advantages of the device described, that is to say the freedom in proportioning the relaxation time constant of the relaxation generator and the independency of the properties of the transistor, renders the said relaxation generator particularly attractive for supervision purposes, the more so as connection of the device to be supervised to the relaxation capacitor 3 does not result in reaction upon the transistor circuit 1, since the relaxation circuit 3, 5 of the relaxation generator is effectively uncoupled by the blocked rectifier 9 of the transistor circuit 1. The device described also affords the advantage of a high independency of variations in supply voltage, since upon variation in the current charging the capacitor due to variation in the supply voltage, the base-bias varies in the same ratio and thus substantially reduces this variation in supply voltage.

Of a device of the described type which has been extensively tested in practice, the following data are given:

| | |
|---|---|
| transistor 1—OC 80 | resistor 10—100 ohms |
| capacitor 3—160 μfs | resistor 12—3 kohms |
| resistor 5—360 kohms | capacitor 13—20 μfs |
| resistor 7—7.5 kohms | rectifier 9—OA202 |
| resistor 8—3 kohms | rectifier 11—OA85 |

The transformation ratio of the feedback transformer 2 is 1:1.

Figure 2:
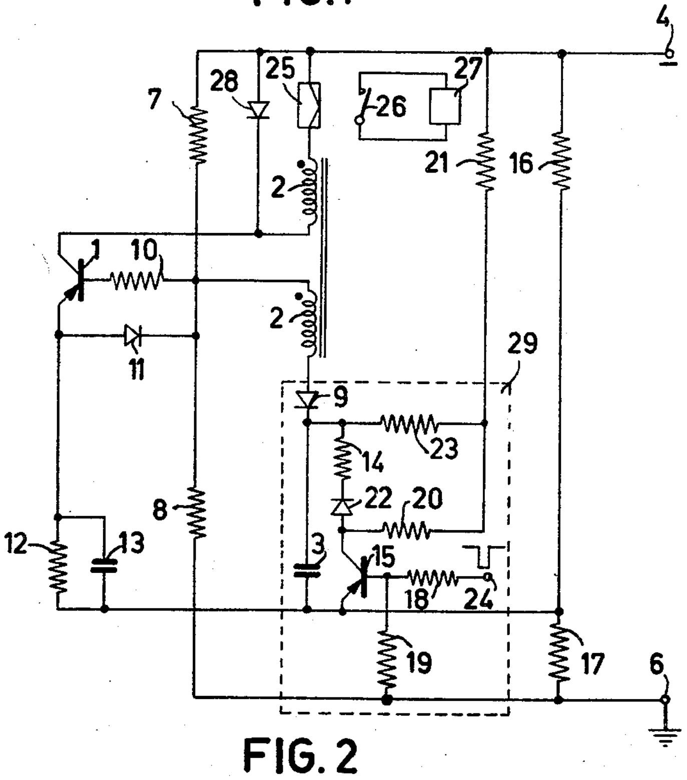
FIGURE 2 shows an embodiment of a device according to the invention which is used for supervising a gate pulse generator in a time-multiplex device.

FIGURE 2 shows a supervision device of a gate pulse generator in a time-multiplex device, comprising a relaxation generator as shown in FIGURE 1, identical elements being indicated by the same reference numerals as in FIGURE 1.

The time-multiplex device is used to pass the carrier telephone signals incoming through the various pairs of conductors of a carrier telephone cable in succession to a pilot signal measuring device for measuring the level of a pilot signal emitted together with the carrier telephone signals in each of the pairs of conductors. In fact, for this purpose, the signals originating from the various pairs of conductors are successively led in a slow rhythm to the pilot signal measuring device by the gate pulses of the gate pulse generator.

In order to supervise the continuous presence of the gate pulses from the gate pulse generator, the series-combination of a series-resistor 14 and a transistor 15 is included parallel to the relaxation capacitor 3, which transistor 15 is cut off by a negative emitter voltage originating from a voltage divider 16, 17 connected between the terminals 4, 6 of the supply voltage source, whilst the pulses originating from the gate pulse generator are supplied as releasing pulses, through a series-resistor 18, to the base of the transistor 15, which is connected via a resistor 19 to earth. The collector of transistor 15 is connected via the series-combination of resistors 20 and 21 to the negative terminal 4 of the supply voltage source and also connected via a rectifier 22 to the relaxation circuit of the relaxation generator 1, formed by the capacitor 3 and the series-resistors 21 and 23. In the blocked condition of the transistor 15, the rectifier 22 is also blocked by the voltage applied to the collector via the resistors 20, 21 and thus decouples the transistor 15 and the relaxation circuit 3, 21, 23 of the relaxation generator 1.

The transistor 15 constitutes a discharging circuit for the relaxation capacitor 3, since each time a negative pulse from the gate pulse generator appears at the input terminal 24 connected to the base of the transistor 15, this transistor becomes conducting for the duration of this pulse of 8 seconds and the relaxation capacitor 3 can discharge during this period via the circuit, resistor 14, rectifier 22 and transistor 15. When the relevant pulse disappears, the transistor 15 is cut off and the relaxation capacitor 3 charges during the subsequent period via the series-resistors 21, 23, until the next release pulse occurs after, for example, 24 seconds, whereupon the described cycle is repeated. By using the steps according to the invention, a considerable relaxation time of the relaxation generator 1 of, for example, 35 seconds, as is required for supervision of the gate pulse generator, may be realized without interfering influencing by leak currents.

With the continuous presence of the pulses originating from the gate pulse generator, the voltage of the relaxation capacitor 3 remains below the response voltage of the relaxation generator 1 which, as has been explained in the foregoing, is determined by the base-bias of the transistor 1, connected as a relaxation generator, so that the relaxation generator does not respond. If, however, the pulses of the gate pulse generator disappear, the voltage across the relaxation generator is enabled, via the series resistors 21, 23, to exceed the response voltage of the relaxation generator 1, which generator thus responds, so that the collector current of the transistor 1 increases to a maximum and hence a guard relay 25, included in the collector circuit, is energized and operates an alarm device 27 via a make contact 26. The relaxation generator now flip-flops between its two conditions in a manner as previously described with reference to FIGURE 1, but the guard relay 25, which is a holding relay or a polar relay, remains in the energized condition, the guard relay 25 being bridged by a rectifier 28 for protecting the transistor 1 against the induction pulses when the transistor 1 flops back to the condition of low collector current.

By using the steps according to the invention, making use of transistors in the manner described, an accurate and reliable supervision is thus realized, namely, material independency of transistor leak currents, independency of variations in supply voltage, and a response level which is exactly determined, whilst interfering reaction of the device to be supervised upon the transistor 1, circuited as a relaxation generator, is avoided. Due to the effective decoupling between the relaxation generator and the circuit to be guarded, the device described affords the important advantage that the same transistor 1 which is circuited as a relaxation generator may be used for simultaneously supervising a plurality of relatively independent circuits, for example a plurality of gate pulse generators associated with several time-multiplex systems. For this purpose, each of these various gate pulse generators is connected to the base circuit of the transistor 1, connected as a relaxation generator, via a separate circuit 29 as indicated in broken lines, which is formed by the rectifier 9, included in the base circuit of the transistor, relaxation circuit 3, 23 and the circuit for discharging the relaxation capacitor 15.

In this arrangement the various devices to be supervised are decoupled and hence do not influence one another. For example, if a defect occurs in one gate pulse generator, the voltage across the relevant relaxation capacitor exceeds the response voltage of the relaxation generator and operates the alarm device as previously described in the foregoing. One guard device only is required for the various circuits to be supervised, resulting not only in a saving of elements, but also in surveyable supervision.

What is claimed is:

1. A transistor relaxation oscillator comprising a transistor having a control electrode, an output electrode, and a common electrode, a source of operating potential having first and second terminals, a series circuit comprising a capacitor and a resistor connected in that order between said first and second terminals, means connecting said common and output electrodes to said first and second terminals respectively, positive feedback circuit means coupled between said output and control electrodes, circuit means connected to said control electrode for providing a substantially constant bias voltage to said control electrode whereby said transistor is biased for continuous conduction with substantially maximum amplification, rectifier means, and circuit means connecting said rectifier means between said control electrode and the junction of said resistor and capacitor, said rectifier means being poled to be unblocked only when the voltage at said junction has a polarity with respect to said bias voltage that would sustain the conduction of said transistor and blocked when the junction voltage has a polarity with respect to said bias voltage that would reduce the conduction of the transistor.

2. A transistor relaxation oscillator comprising a transistor having a control electrode, an output electrode, and a common electrode, a source of operating potential having first and second terminals, a transformer having primary and secondary windings, a series circuit of a capacitor and resistor connected in that order between said first and second terminals, means connecting said primary winding between said second terminal and said output electrode, means connecting said common electrode to said first terminal, circuit means connected to said control electrode for providing a substantially constant bias voltage to said control electrode whereby said transistor is biased for continuous conduction with substantially maximum amplification, rectifier means, and means serially connecting said secondary winding and rectifier means between said control electrode and the junction of said capacitor and resistor, said rectifier means being poled to be blocked only when the voltage at said junction has a polarity with respect to said bias voltage that would reduce the conduction of said transistor and unblocked only when the junction voltage has a polarity with respect to said bias voltage which would sustain the conduction of the transistor.

3. The oscillator of claim 2, comprising resistance means serially connected to said control electrode, and a rectifier connected in parallel with the series combination of said resistance means and the common-electrode-control electrode path of said transistor, said rectifier being poled to pass current in the same direction as said common-electrode-control electrode path, whereby the current in said last-mentioned path is limited.

4. A transistor relaxation oscillator comprising a transistor having a control electrode, an output electrode, and a common electrode, a source of operating potential having first and second terminals, a series circuit comprising a capacitor and a resistor connected in that order between said first and second terminals, means connecting said common and control electrodes to said first and second terminals respectively, positive feedback circuit means coupled between said output and control electrodes, circuit means providing a substantially constant bias voltage connected to said control electrode whereby said transistor is biased for continuous conduction with substantially maximum amplification, rectifier means, means connecting said rectifier means between said control electrode and the junction of said resistor and capacitor whereby said rectifier means is blocked only when the voltage at said control electrode is closer than the voltage at said junction to the potential of said second terminal, and discharge circuit means connected in parallel with said capacitor, said discharge circuit means comprising a second transistor, resistance means, means serially connecting said resistance means and the collector current path of said second transistor in parallel with said capacitor, a source of discharging signals, and means applying said discharging signals to the control electrode of said second transistor.

References Cited by the Examiner

UNITED STATES PATENTS

| | | | |
|---|---|---|---|
| 2,573,284 | 10/51 | Shaw | 331—146 |
| 2,816,230 | 12/57 | Lindsay | 331—112 |
| 2,858,438 | 10/58 | Merrill | 331—112 |
| 2,898,557 | 4/59 | Dahlin | 331—112 X |
| 2,915,710 | 12/59 | Schieve et al. | 331—112 |
| 2,926,284 | 2/60 | Finkelstein et al. | 331—112 X |
| 2,972,120 | 2/61 | Kircher et al. | 332—16 X |
| 2,981,898 | 4/61 | St. John | 331—112 |
| 3,034,023 | 5/62 | Stratton | 331—112 X |
| 3,036,299 | 5/62 | Uphoff | 331—112 X |
| 3,100,283 | 8/63 | Makow | 331—112 X |

FOREIGN PATENTS

| | | |
|---|---|---|
| 823,315 | 11/59 | Great Britain. |

ROY LAKE, *Primary Examiner.*

HERMAN KARL SAALBACH, JOHN KOMINSKI, *Examiners.*